United States Patent
Beck et al.

(10) Patent No.: US 10,408,309 B2
(45) Date of Patent: Sep. 10, 2019

(54) TRANSMISSION AND DRIVETRAIN FOR A MOTOR VEHICLE

(71) Applicant: ZF Friedrichshafen AG, Friedrichshafen (DE)

(72) Inventors: Stefan Beck, Eriskirch (DE); Michael Wechs, Weißensberg (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 15/693,587

(22) Filed: Sep. 1, 2017

(65) Prior Publication Data

US 2018/0073610 A1 Mar. 15, 2018

(30) Foreign Application Priority Data

Sep. 9, 2016 (DE) .......................... 10 2016 217 248

(51) Int. Cl.
*F16H 3/66* (2006.01)
*B60K 6/365* (2007.10)
(Continued)

(52) U.S. Cl.
CPC .............. *F16H 3/663* (2013.01); *B60K 6/365* (2013.01); *B60K 6/48* (2013.01); *B60K 6/547* (2013.01);
(Continued)

(58) Field of Classification Search
CPC ..... F16H 2200/2041; F16H 2200/2043; F16H 2200/2046; F16H 2200/2064;
(Continued)

(56) References Cited

U.S. PATENT DOCUMENTS 5,135,444 A * 8/1992 Hattori .................... F16H 3/663
475/285
5,951,433 A 9/1999 Tsukamoto et al.
(Continued)

FOREIGN PATENT DOCUMENTS

DE 69724082 T2 2/2004
DE 102013225205 A1 6/2015
(Continued)

OTHER PUBLICATIONS

German Search Report DE102016217248.4, dated Aug. 17, 2017. (10 pages).

*Primary Examiner* — Jacob S. Scott
*Assistant Examiner* — James J Taylor, II
(74) *Attorney, Agent, or Firm* — Dority & Manning, P.A.

(57) ABSTRACT

A motor vehicle transmission comprising a drive shaft, an output shaft, a planetary gear set system, and four shift elements. The first planet gear meshes with the first sun gear, first ring gear, and with one of the second planet gears. The second planet gear meshes with the second sun gear and second ring gear. The first sun gear has a smaller diameter than the second sun gear. The first ring gear has a larger diameter than the second ring gear, and is connected to the output shaft. The second ring gear is rotationally fixable by closing the first shift element. The drive shaft is connectable to the second sun gear by closing the third shift element. The drive shaft is connectable to the planet carrier by closing the fourth shift element. The first sun gear is rotationally fixable by closing the second shift element.

19 Claims, 15 Drawing Sheets

(51) Int. Cl.
*B60K 6/48* (2007.10)
*B60K 6/547* (2007.10)
*F16H 3/72* (2006.01)
*F16H 3/44* (2006.01)

(52) U.S. Cl.
CPC ............... *B60K 2006/4816* (2013.01); *B60K 2006/4825* (2013.01); *F16H 3/724* (2013.01); *F16H 2003/445* (2013.01); *F16H 2200/0047* (2013.01); *F16H 2200/0052* (2013.01); *F16H 2200/0056* (2013.01); *F16H 2200/2005* (2013.01); *F16H 2200/2007* (2013.01); *F16H 2200/2025* (2013.01); *F16H 2200/2041* (2013.01); *F16H 2200/2043* (2013.01); *F16H 2200/2046* (2013.01)

(58) Field of Classification Search
CPC ..... F16H 2200/2094; F16H 2200/2007; F16H 2200/202; F16H 2200/0047; F16H 2200/0052; F16H 2200/0056; B60K 2006/4816; B60K 2006/4825; B60K 6/547; B60K 6/365
See application file for complete search history.

(56) References Cited

U.S. PATENT DOCUMENTS

| | | | | |
|---|---|---|---|---|
| 8,308,595 | B2 * | 11/2012 | Noda | B60L 3/0023 475/116 |
| 9,033,847 | B2 * | 5/2015 | Souda | F16H 3/663 475/280 |
| 9,334,929 | B2 * | 5/2016 | Hart | F16H 3/663 |
| 2013/0260948 | A1 * | 10/2013 | Ando | F16H 3/62 475/276 |
| 2017/0334280 | A1 * | 11/2017 | Lecomte | B60K 6/365 |

FOREIGN PATENT DOCUMENTS

| | | |
|---|---|---|
| EP | 3100888 A1 | 12/2016 |
| EP | 3100890 A1 | 12/2016 |
| JP | 2001241519 A | 9/2001 |

* cited by examiner

| | 05 | 06 | 13 | 14 |
|---|---|---|---|---|
| 1 | X | | X | |
| 2 | | X | X | |
| 3 | | | X | X |
| 4 | | X | | X |
| 5 | X | | | X |

| | 04 | 05 | 06 | 13 | 14 |
|---|---|---|---|---|---|
| 21 | X | | | X | |
| 22 | | X | | X | |
| 23 | | | X | X | |
| 24 | | | | X | X |
| 25 | | | X | | X |
| 26 | | X | | | X |

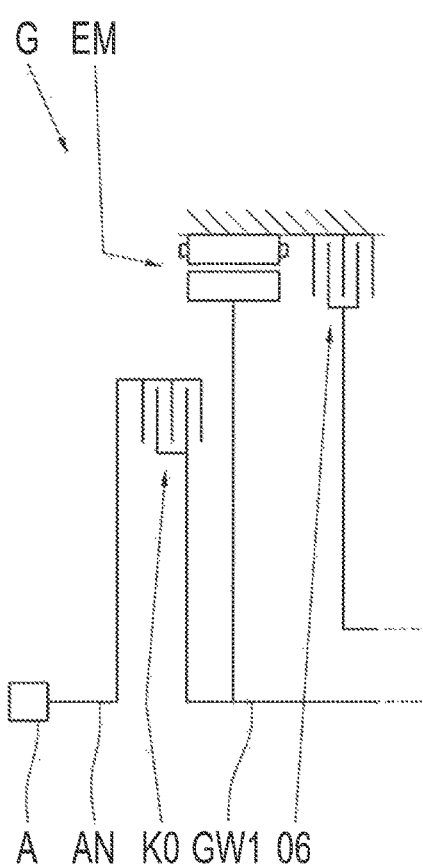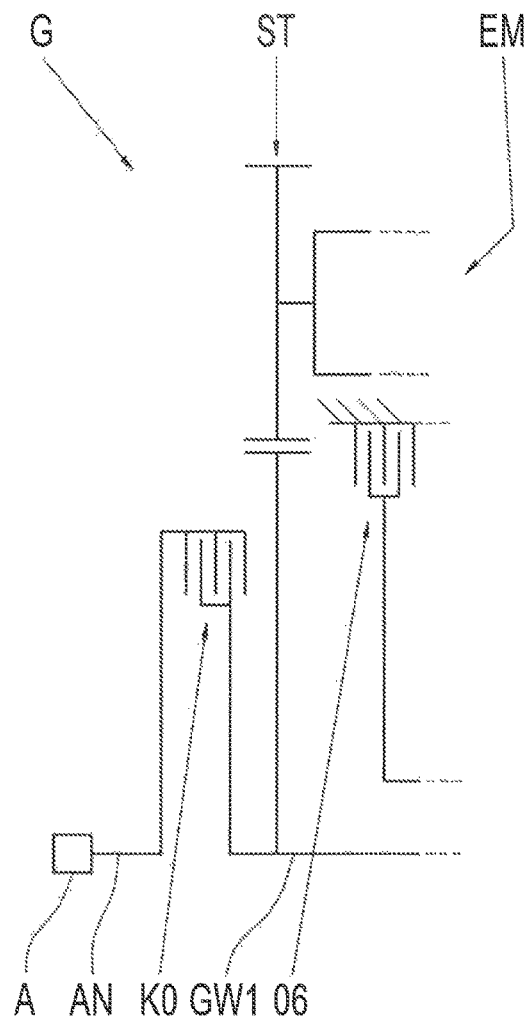
Fig. 12
Fig. 13

|     | 04 | 05 | 06 | 13 | 14 |
|-----|----|----|----|----|----|
| 21  | X  |    |    | X  |    |
| 22  |    | X  |    | X  |    |
| 23  |    |    | X  | X  |    |
| 24  |    |    |    | X  | X  |
| 25  |    |    | X  |    | X  |
| 26  |    | X  |    |    | X  |
| E1  | X  |    |    |    |    |
| E2  |    | X  |    |    |    |
| E3  |    |    | X  |    |    |
| EDA |    |    |    |    | X  |

Fig. 18

TRANSMISSION AND DRIVETRAIN FOR A MOTOR VEHICLE

BACKGROUND

The invention relates generally to a transmission for a motor vehicle, and to a drive train for a motor vehicle having a transmission of said type. Here, a transmission refers particularly to a multi-ratio transmission in which a multiplicity of gear ratios, that is to say fixed transmission ratios, between the drive shaft and the output shaft of the transmission is selectable through shift elements, preferably automatically. The shift elements are in this case, for example, clutches or brakes. Such transmissions are particularly used in motor vehicles for suitably adapting the rotational speed and torque output characteristics of the drive unit to the driving resistances of the vehicle.

The applicant's patent application DE 10 2013 225 205 A1 describes a transmission having an input shaft, an output shaft, a planetary gear set system with a total of five shafts in rotational speed order, and four shift elements. The transmission is designed for implementing four forward gear ratios.

SUMMARY OF THE INVENTION

The object of the present invention is to provide a transmission suitable for forming five forward gear ratios.

The transmission according to the present invention has a drive shaft, an output shaft, a planetary gear set system and at least one first, second, third and fourth shift element. The planetary gear set system includes a first sun gear, a second sun gear, a planet carrier, a first ring gear, a second ring gear, first planet gears and second planet gears.

Each of the first planet gears meshes with the first sun gear, with the first ring gear and with one of the second planet gears. Each of the second planet gears furthermore meshes with the second sun gear and with the second ring gear. The first and second planet gears are rotatably mounted on the planet carrier. The first sun gear has a smaller effective diameter than the second sun gear. The first ring gear has a larger effective diameter than the second ring gear.

The output shaft is permanently connected to the first ring gear. The second ring gear is rotationally fixed by closing the first shift element. The drive shaft is connectable to the second sun gear by closing the third shift element. The drive shaft is connectable to the planet carrier by closing the fourth shift element.

According to the invention, the first sun gear is rotationally fixed by closing the second shift element. In other words, the first sun gear now no longer serves for the connection of an electric machine, but rather serves for the connection of a shift element which acts as a brake. By this assignment of the second shift element according to the invention, it is possible to form five forward gear ratios between drive shaft and output shaft, as discussed below.

Five forward gear ratios between drive shaft and output shaft can be realized through selective pairwise closure of the four shift elements. A first forward gear ratio is formed by closing the first and the third shift element. A second forward gear ratio is formed by closing the second and the third shift element. A third forward gear ratio is formed by closing the third and the fourth shift element. A fourth forward gear ratio is formed by closing the second and the fourth shift element. A fifth forward gear ratio is formed by closing the first and the fourth shift element.

The planetary gear set system is preferably arranged axially between the fourth shift element and the second shift element. This facilitates the power transmission from the output shaft to a differential transmission within the transmission or external to the transmission. The power acting at the output shaft can be distributed by the differential transmission to drive wheels of the motor vehicle.

In a preferred refinement, the transmission has an additional shift element. The planet carrier is rotationally fixed by closing the additional shift element. The additional shift element makes it possible to form an additional forward gear ratio with a particularly short transmission ratio, specifically by closing the third shift element and the additional shift element.

In principle, each of the shift elements may be a frictionally engaging shift element or a positively engaging shift element. The additional shift element is preferably a positively engaging shift element. The additional shift element may alternatively be a frictionally engaging frictional shift element, the plates of which have only lining-free friction surfaces.

The transmission may also have a second additional shift element, the closing of which can connect the drive shaft to the second ring gear. The second additional shift element makes it possible to form a reverse gear ratio between drive shaft and output shaft, by closing both additional shift elements.

The second additional shift element is preferably a positively engaging shift element. As an alternative to this, the second additional shift element may be a frictionally engaging frictional shift element, the plates of which have only lining-free friction surfaces.

Positively engaging shift elements in the closed state produce the connection by positive locking, and are characterized in the open state by lower drag losses than frictionally engaging shift elements. As a result of the low drag losses in the open state, the efficiency of the transmission is improved. Frictionally engaging shift elements with lining-free friction surfaces are designed for high contact pressures, and can therefore have a small friction surface and a small number of plates. The drag losses of a shift element of said type can thereby be reduced.

In a preferred refinement, the transmission includes an electric machine with a rotationally fixed stator and with a rotatable rotor, the rotor being permanently connected to the drive shaft or to the second sun gear. The permanent connection may also be realized via an additional transmission gearing, for example via a spur-gear drive or via a chain drive. The electric machine may be arranged axially parallel with respect to the drive shaft or first sun gear.

The functionality of the transmission is expandable by the electric machine, by which the transmission is suitable for the drive train of a hybrid vehicle. The connection of the rotor to the drive shaft enables all gear ratio stages to be utilized through the electric machine in the drive of the hybrid vehicle. The connection of the rotor to the second sun gear allows the output shaft to be driven by the electric machine without a reaction on the drive shaft. Such electric gear ratio stages are possible by closing the first or second shift element or by closing the auxiliary shift element.

The connection of the rotor to the first sun gear furthermore permits a power-split operation between drive shaft, rotor and output shaft in the case of only the fourth shift element being closed. For example, a launch process can be realized in this way.

The transmission preferably has a separating clutch. By closing the separating clutch, the drive shaft is connected to a connecting shaft of the transmission. The connecting shaft serves as an interface to a drive unit external to the transmission, for example to an internal combustion engine.

In a preferred refinement, the connecting shaft has two sections which are connected to one another by at least one torsional vibration damper. Rotational oscillations generated by the drive unit external to the transmission can thus be damped toward the drive shaft.

The transmission may be a constituent part of a drive train of a motor vehicle. The drive train also has, in addition to the transmission, an internal combustion engine which may be connected or connectable in rotationally elastic fashion to the drive shaft of the transmission via the optional torsional vibration damper. The output shaft of the transmission is operatively connected in terms of drive to a differential transmission within the transmission or external to the transmission, which differential transmission is operatively connected to wheels of the motor vehicle. If the transmission has the electric machine, the drive train permits multiple operating modes of the motor vehicle. During electric driving operation, the motor vehicle is driven by the electric machine of the transmission. During combustion-engine-powered operation, the motor vehicle is driven by the internal combustion engine. During hybrid operation, the motor vehicle is driven both by the internal combustion engine and by the electric machine of the transmission.

A permanent connection refers to a connection between two elements which exists at all times. Such permanently connected elements always rotate with the same dependency between their rotational speeds. No shift element is situated in a permanent connection between two elements. A permanent connection is therefore distinct from a shiftable connection. A permanently rotationally fixed connection refers to a connection between two elements which exists at all times and the connected elements of which thus always exhibit the same rotational speed.

In the context of the gear ratio formation, the expression "closure of a shift element" is to be understood to mean a process in which the shift element is actuated such that it transmits a high level of torque at the end of the closing process. Whereas positively engaging shift elements in the "closed" state do not permit any rotational speed difference, in frictionally engaging shift elements in the "closed" state the formation of a small rotational speed difference between the shift element halves is possible in a desired or undesired manner.

Additional advantages and advantageous embodiments of the transmission and drivetrain in accordance with the invention arise from the patent claims and the embodiments described below, with reference to the drawings in terms of principle, whereas, in the description of the various embodiments, for the benefit of clarity, the same reference signs are used for structurally and functionally identical components.

BRIEF DESCRIPTION OF THE DRAWINGS

Exemplary embodiments of the invention are described in detail below on the basis of the figures. The following is shown:

FIGS. 10 to 13 show schematic views relating to the connection of an electric machine;

FIG. 18 shows an engagement sequence diagram;

DETAILED DESCRIPTION

Figures 1, 2:
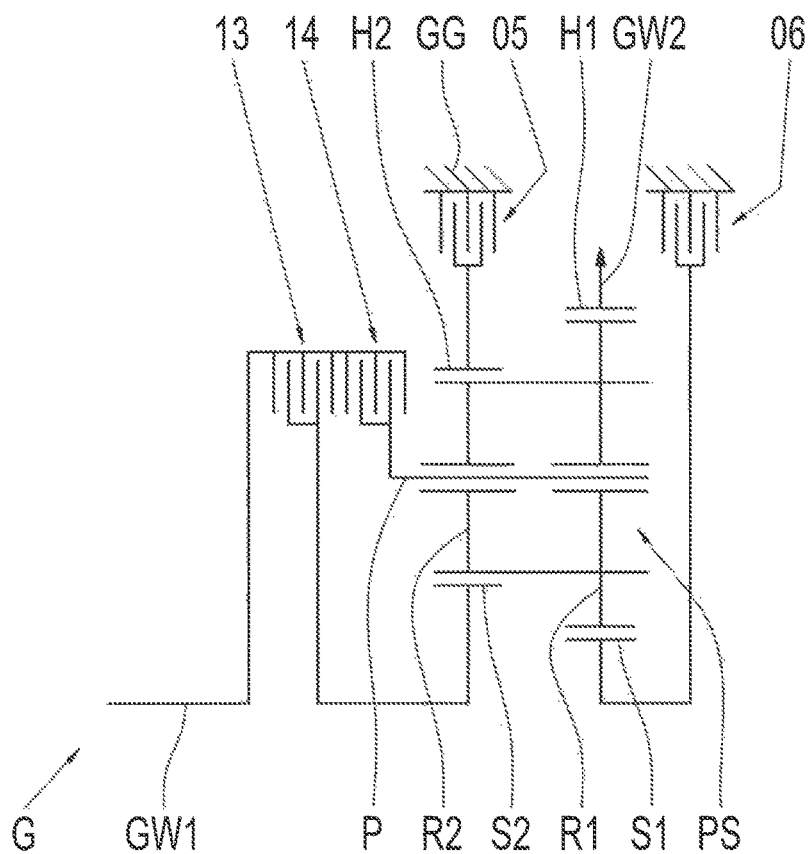
FIG. 1 shows a schematic view of a transmission according to a first exemplary embodiment.
FIG. 2 shows an engagement sequence diagram.

FIG. 1 shows a schematic illustration of a transmission G according to a first exemplary embodiment of the invention. The transmission G has a drive shaft GW1, an output shaft GW2, a planetary gear set system PS, and a first, a second, a third and a fourth shift element 05, 06, 13, 14.

The planetary gear set system PS has a first sun gear S1, a second sun gear S2, a planet carrier P, a first ring gear H1, a second ring gear H2, first planet gears R1 and second planet gears R2. Each of the first planet gears R1 meshes with the first sun gear S1, with the first ring gear H1 and with one of the second planet gears R2. Each of the second planet gears R2 meshes with the second sun gear S2 and with the second ring gear H2. The first and second planet gears R1, R2 are rotatably mounted on the planet carrier P. The first sun gear S1 has a smaller effective diameter than the second sun gear S2, whereas the first ring gear H1 has a larger effective diameter than the second ring gear H2.

Figure 20:
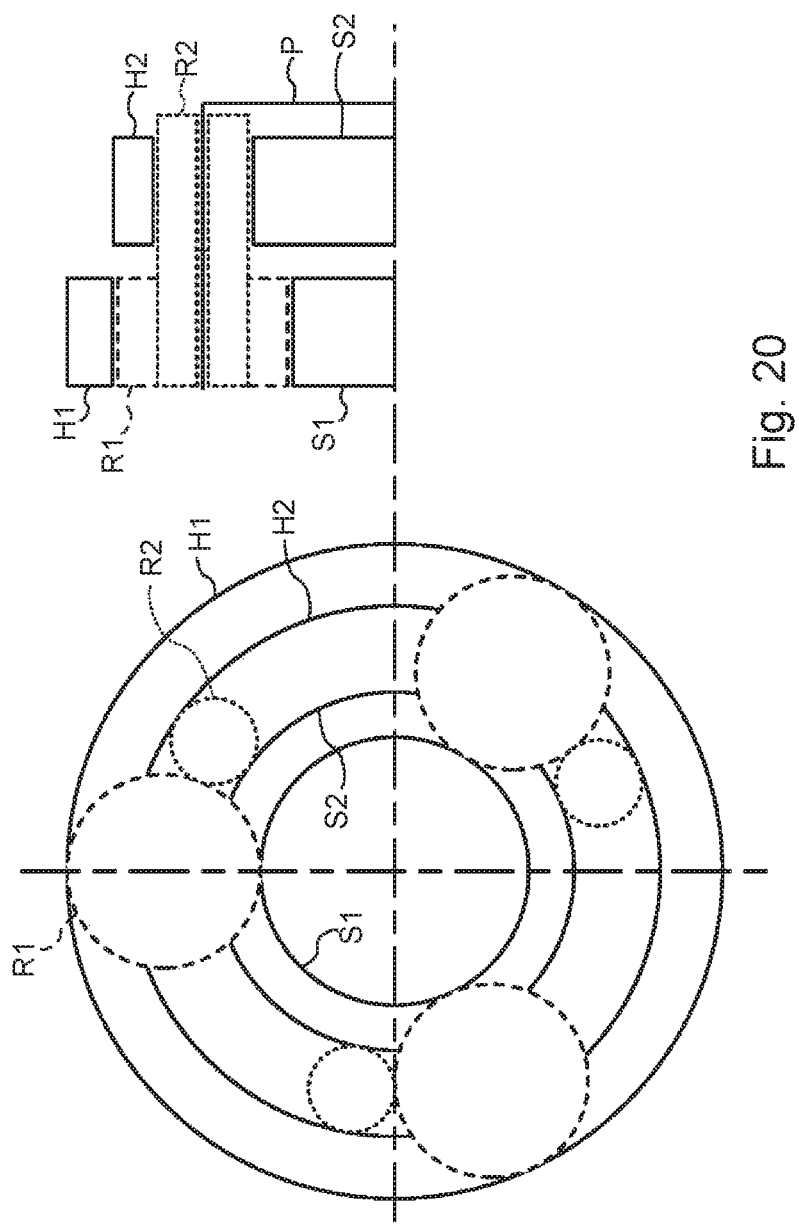
FIG. 20 shows a perspective view of a planetary gear set system in accordance with aspects of the present subject matter.

In other words, the planetary gear set system PS is formed functionally by two minus gear sets, wherein each planet gear of the gear set with the higher fixed carrier transmission ratio is an elongated planet gear and extends into the gear set with the lower fixed carrier transmission ratio in order to mesh with a planet gear of the gear set with the higher fixed carrier transmission ratio. For example as, shown in FIG. 20, the gear set with the higher fixed carrier transmission ratio is formed functionally by the second sun gear S2, the second planet gears R2 and the second ring gear H2. The gear set with the lower fixed carrier transmission ratio is formed functionally by the first sun gear S1, the first planet gears R1 and the first ring gear H1. The planet carrier P is functionally a constituent part of both gear sets.

The second ring gear H2 rotationally fixable by closing the first shift element 05. The first sun gear S1 is rotationally fixable by closing the second shift element 06. The drive shaft GW1 is connectable to the second sun gear S2 by closing the third shift element 13. The drive shaft GW1 is connectable to the planet carrier P by closing the fourth shift element 14. The output shaft GW2 is permanently connected to the first ring gear H1.

The shift elements 05, 06, 13, 14 are illustrated schematically as frictionally engaging multi-plate shift elements. This is to be regarded merely as an example. Each or individual shift element(s) 05, 06, 13, 14 may alternatively be a positively engaging shift element or a frictionally engaging shift element of some other type of construction.

The transmission G according to the first exemplary embodiment is suitable for use in a front-transverse or rear-transverse drive train of a motor vehicle. For this purpose, the output shaft GW2 has a suitable interface which serves for power transmission to a differential transmission (not illustrated in FIG. 1) within the transmission or external to the transmission. The differential transmission is provided for arrangement axially parallel with respect to the output shaft GW2. The power transmission is preferably performed via a single-stage or multi-stage spur-gear drive or via a chain drive.

The third and fourth shift elements 13, 14 are arranged on a first face side of the planetary gear set system PS, whereas the second shift element 06 is arranged on the opposite face side of the planetary gear set system PS. The first shift element 05 is arranged radially outside the second ring gear H2.

FIG. 2 shows an engagement sequence diagram for the transmission G according to the first exemplary embodiment, the engagement sequence diagram shows the formation of five forward gear ratios 1 to 5. In the engagement sequence diagram, an X denotes which of the shift elements 05, 06, 13, 14 are closed to form the respective forward gear ratio 1 to 5.

Figure 3:
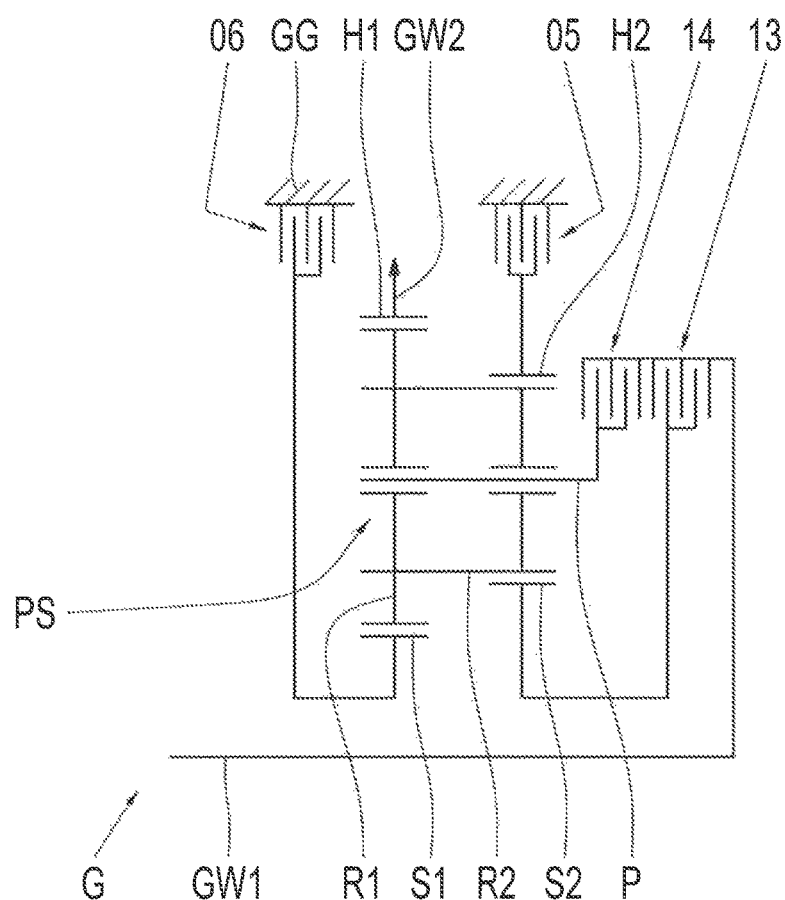
FIG. 3 and FIG. 4 show schematic views of transmissions according to a second and a third exemplary embodiment.

FIG. 3 is a schematic illustration of a transmission G according to a second exemplary embodiment of the invention, which substantially corresponds to the first exemplary embodiment. The planetary gear set system PS is now of axially mirror-inverted construction, such that the output shaft GW2 is arranged axially closer to the drive interface of the drive shaft GW1. The shift elements 05, 06, 13, 14 are arranged correspondingly differently. The formation of the forward gear ratios 1 to 5 is not changed thereby.

Figures 4, 5:
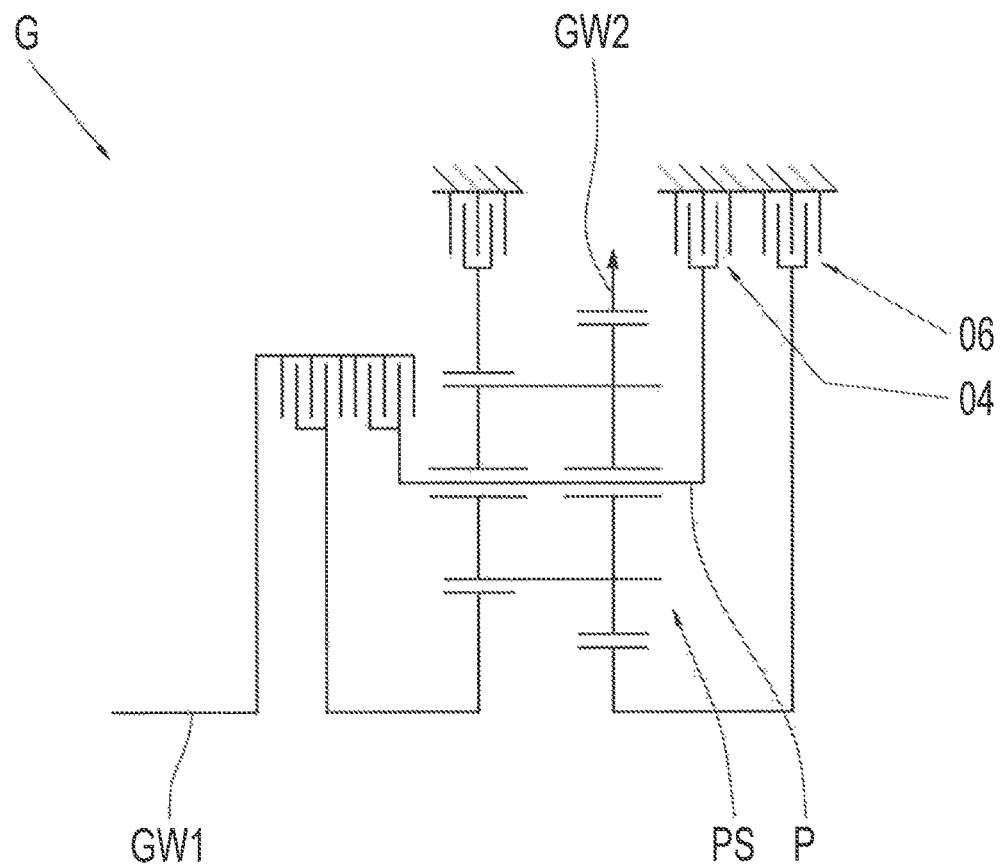
FIG. 5 shows an engagement sequence diagram.

FIG. 4 is a schematic illustration of a transmission G according to a third exemplary embodiment of the invention, which substantially corresponds to the first exemplary embodiment. The transmission G now has an additional shift element 04. The planet carrier P is rotationally fixable by closing the additional shift element 04. The additional shift element 04 is arranged axially between the planetary gear set system PS and the second shift element 06.

FIG. 5 shows an engagement sequence diagram for the transmission G according to the third exemplary embodiment. An additional forward gear ratio with a short transmission ratio is formable by the additional shift element 04. Six forward gear ratios 21 to 26 are thus now available. In the engagement sequence diagram, an X denotes which of the shift elements 05, 06, 13, 14, 04 are closed to form the respective gear ratio stage 21 to 26.

Figure 6:
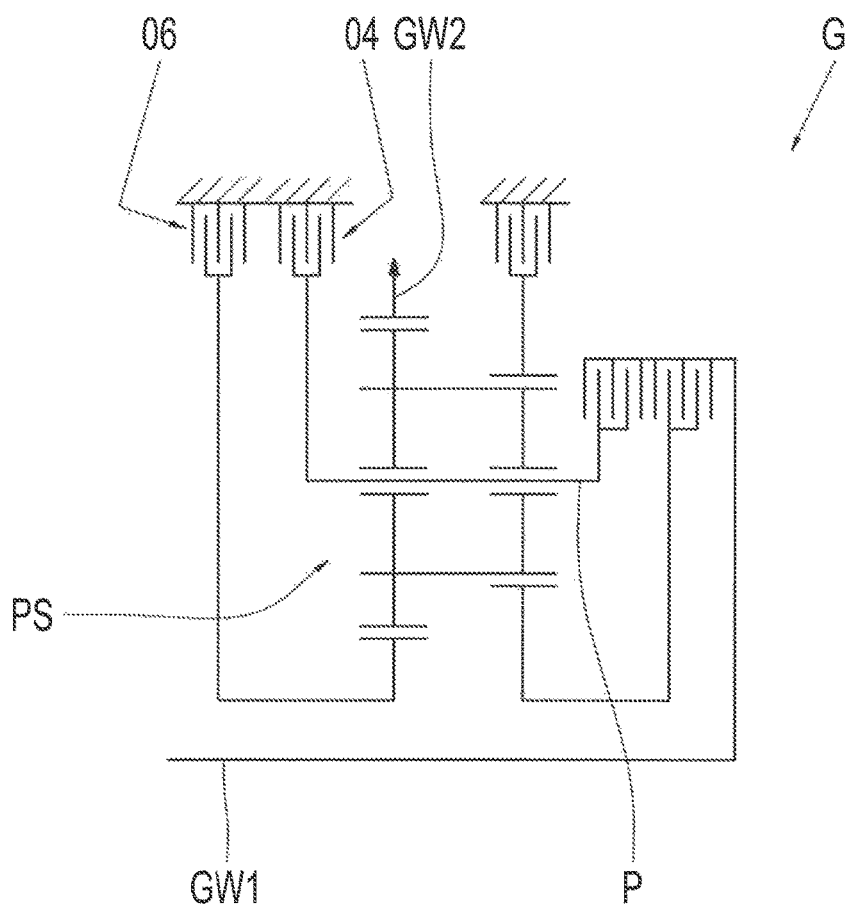
FIG. 6 and FIG. 7 show schematic views of transmissions according to a fourth and a fifth exemplary embodiment.

FIG. 6 is a schematic illustration of a transmission G according to a fourth exemplary embodiment of the invention, which substantially corresponds to the second exemplary embodiment illustrated in FIG. 3. Only the additional shift element 04 has been added. The gear ratio formation corresponds to the engagement sequence diagram in FIG. 5.

In FIG. 4 and FIG. 6, the additional shift element 04 is illustrated schematically as a frictionally engaging multi-plate shift element. This is to be regarded merely as an example. The additional shift element 04 may also be a positively engaging shift element. In this case, the additional shift element 04 should be arranged at as small a diameter as possible in order to minimize the effort in terms of construction for the positively engaging connection.

Figures 7, 8:
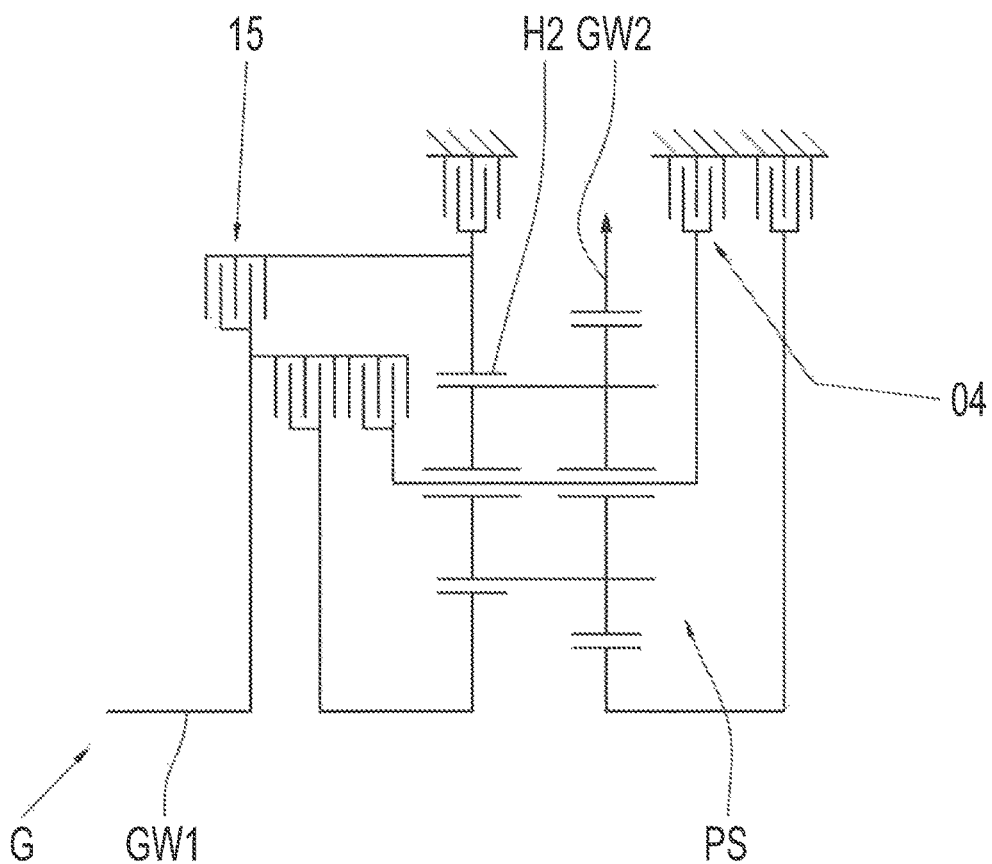
FIG. 8 shows an engagement sequence diagram.

FIG. 7 is a schematic illustration of a transmission G according to a fifth exemplary embodiment of the invention, which substantially corresponds to the third exemplary embodiment. The transmission G now has a second additional shift element 15 in addition to the additional shift element 04. The drive shaft GW1 is connectable to the second ring gear H2 by closing the second additional shift element 15.

FIG. 8 shows an engagement sequence diagram for the transmission G according to the fifth exemplary embodiment. A reverse gear ratio R and a seventh forward gear ratio 27 can be realized between the drive shaft GW1 and the output shaft GW2 by the second additional shift element 15. In the engagement sequence diagram, an X denotes which of the shift elements 05, 06, 13, 14, 04, 15 are closed to form the respective gear ratio stages 21 to 27, R.

Figure 9:
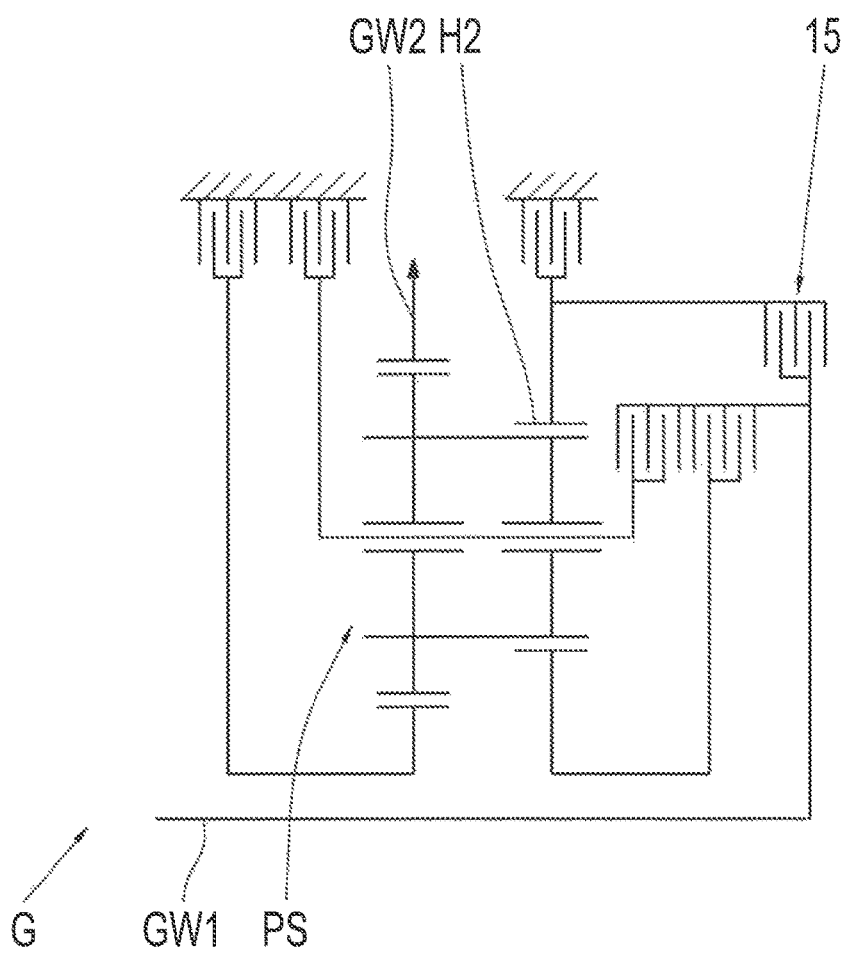
FIG. 9 shows a schematic view of a transmission according to a sixth exemplary embodiment.

FIG. 9 is a schematic illustration of a transmission G according to a sixth exemplary embodiment of the invention, which substantially corresponds to the fourth exemplary embodiment illustrated in FIG. 6. Only the second additional shift element 15 has been added. The gear ratio formation corresponds to the engagement sequence diagram in FIG. 8.

Figure 10:
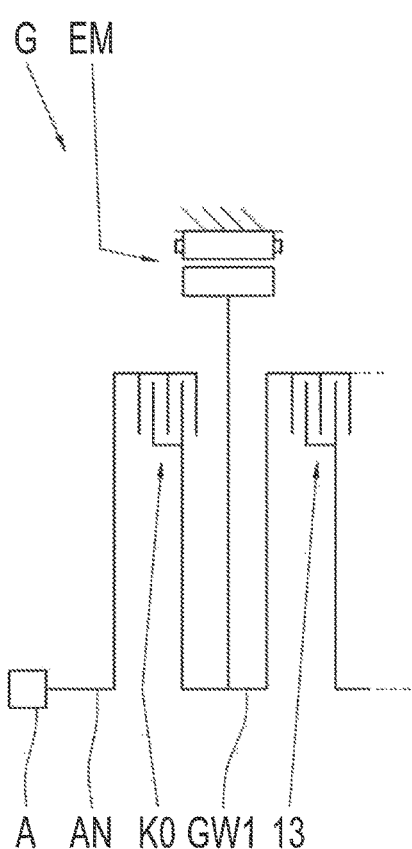

FIG. 10 shows a variant for the connection of an electric machine EM to the above-described exemplary embodiments one, three and five of the transmission G. The electric machine EM has a rotationally fixed stator and a rotatable rotor, wherein the rotor is permanently connected to the drive shaft GW1. The electric machine EM is arranged coaxially with respect to the drive shaft GW1. A clutch K0 is arranged in sections radially within the rotor. The drive shaft GW1 is connectable to a connecting shaft AN of the transmission G by closing the clutch K0. The connecting shaft AN has an interface A which is suitable for torque transmission from a drive unit, which is not illustrated and which is external to the transmission, to the connecting shaft AN. The interface A may, for example, be a spline toothing or a flange.

Figure 11:
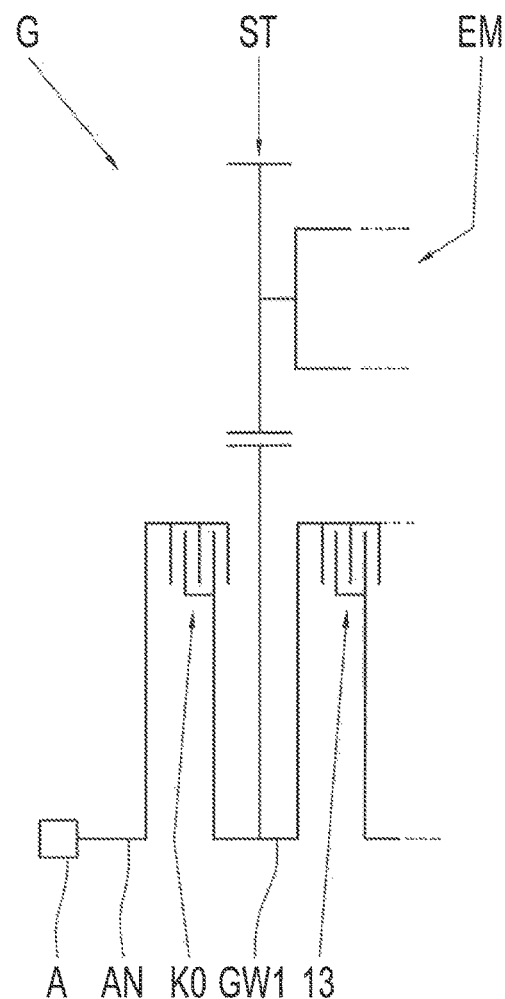

FIG. 11 shows a further variant for the connection of an electric machine EM to the above-described exemplary embodiments one, three and five of the transmission G. The electric machine EM is now arranged axially parallel to the drive shaft GW1 and is permanently connected to the drive shaft GW1 via an additional transmission gearing ST. The additional transmission gearing ST is a single-stage spur gear set. This is to be regarded merely as an example. The additional transmission gearing ST could also be a multi-stage spur-gear drive or a chain drive.

FIG. 12 shows a variant for the connection of an electric machine EM to the above-described exemplary embodiments two, four and six of the transmission G, with a coaxial electric machine EM. FIG. 13 shows a variant for the connection of an electric machine EM to the above-described exemplary embodiments two, four and six of the transmission G with an axially parallel electric machine EM. For further explanation, reference is made to the description relating to FIG. 10 and FIG. 11.

Figure 14:
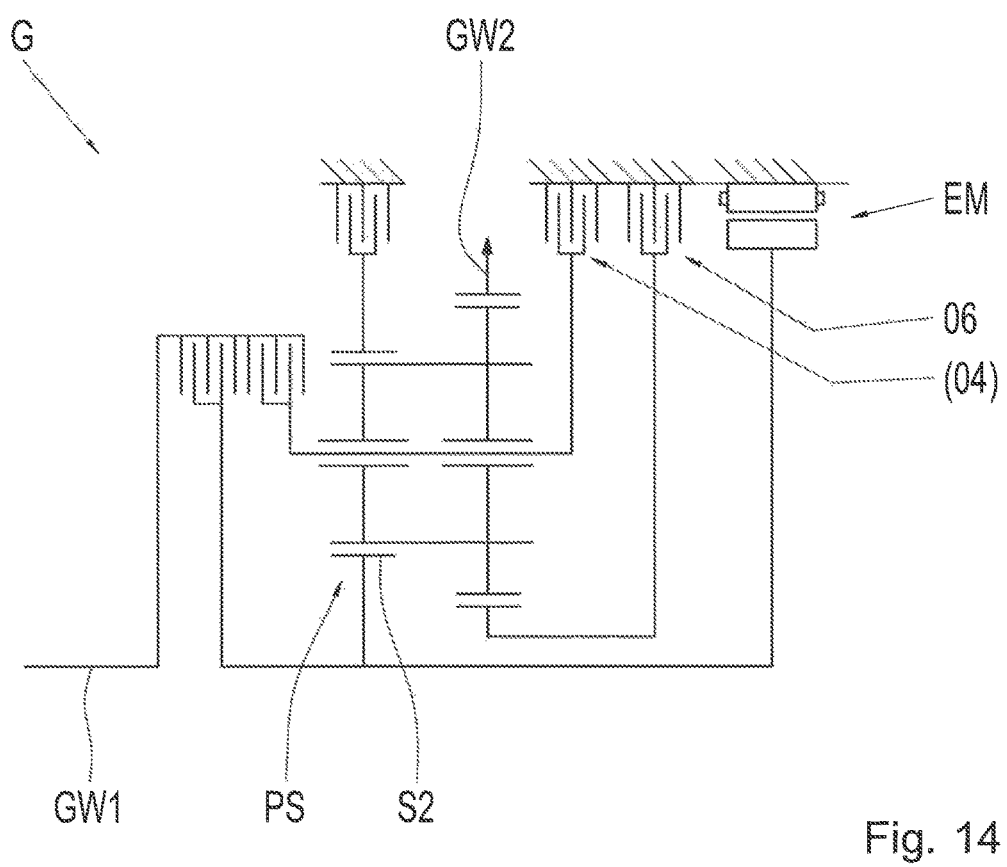
FIG. 14 shows a schematic view of a transmission according to a seventh exemplary embodiment.

FIG. 14 shows a schematic view of a transmission G according to a seventh exemplary embodiment, which substantially corresponds to the third exemplary embodiment. The transmission G has an electric machine EM which is arranged coaxially with respect to the drive shaft GW1 and which is permanently connected to the second sun gear S2. The second shift element 06 is in this case arranged axially between the planetary gear set system PS and the electric machine EM. The additional shift element 04 is included merely optionally.

Figure 15:
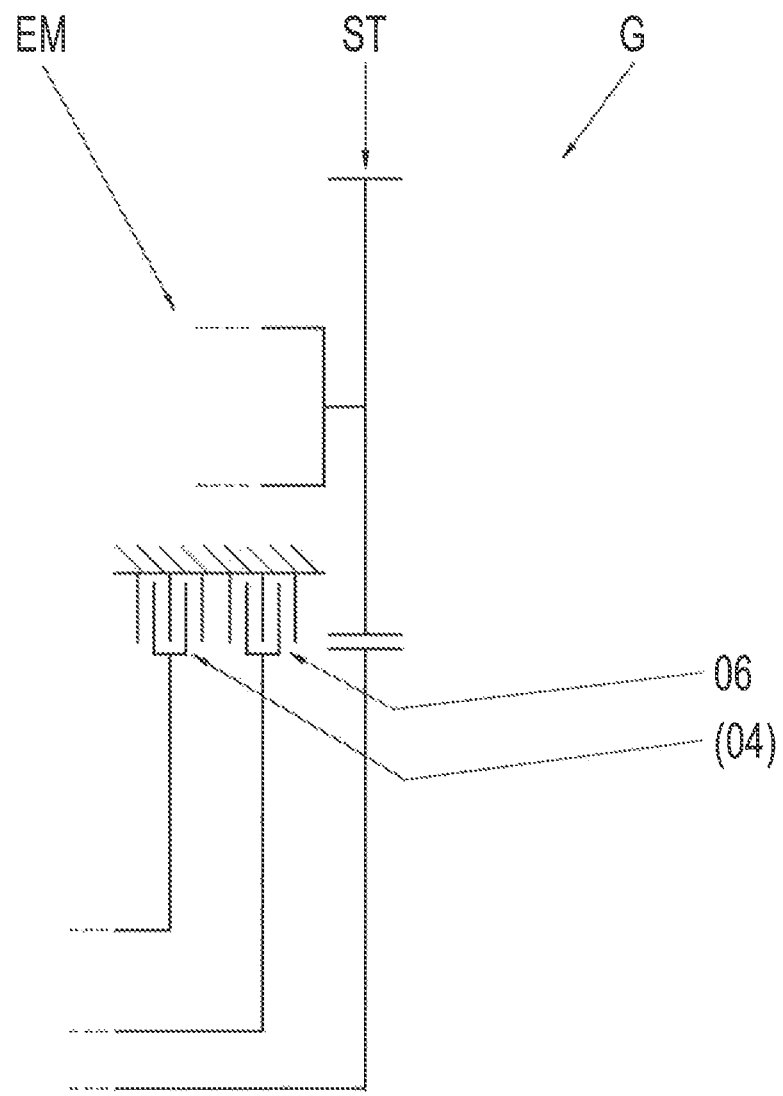
FIG. 15 shows a schematic view relating to the connection of an electric machine.

FIG. 15 shows a variant of the seventh exemplary embodiment, now with an electric machine EM arranged axially parallel. The permanent connection to the second sun gear S2 is now realized via the transmission gearing ST, which is, for example, a single-stage spur-gear set.

Figure 16:
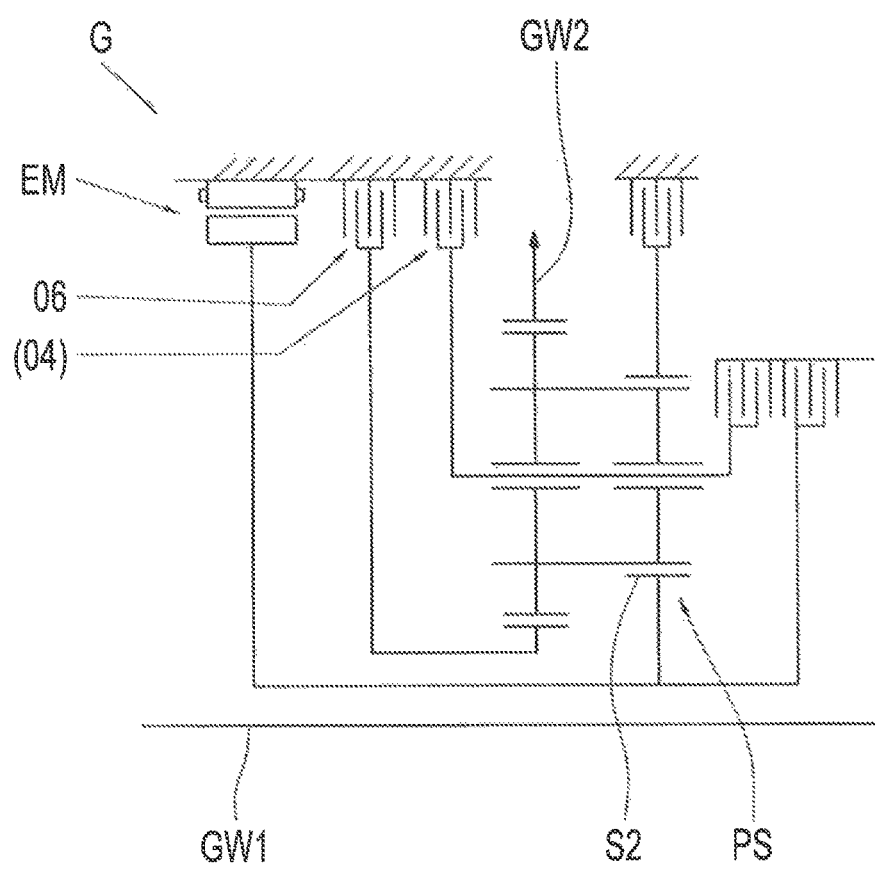
FIG. 16 shows a schematic view of a transmission according to an eighth exemplary embodiment.
Figure 17:
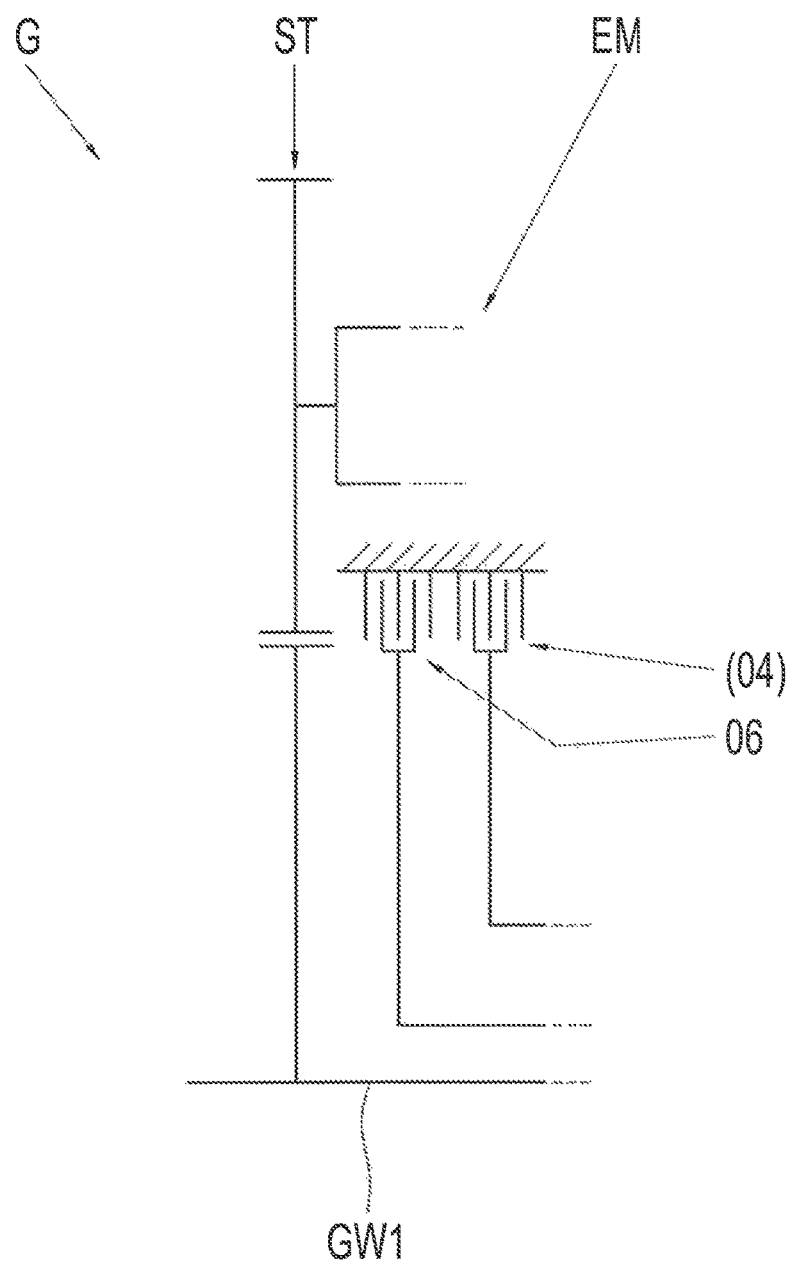
FIG. 17 shows a schematic view relating to the connection of an electric machine.

FIG. 16 shows a schematic view of a transmission G according to an eighth exemplary embodiment, which substantially corresponds to the fourth exemplary embodiment, with the addition of an electric machine EM which is permanently connected to the second sun gear S2 and which is arranged coaxially with respect to the drive shaft GW1. FIG. 17 shows a corresponding variant with an electric machine EM arranged axially parallel. The additional shift element 04 is again included merely optionally.

FIG. 18 shows an engagement sequence diagram for the transmission G according to the seventh and eighth exemplary embodiments. Through the connection of the electric machine EM to the second sun gear S2, additional operating modes of the transmission G are possible, including three electric gear ratio stages E1, E2, E3 and a power-split operating mode EDA. In the electric gear ratio stages E1, E2, E3, the electric machine EM can drive the output shaft GW2 without driving the drive shaft GW1 at the same time. In the power-split operating mode EDA, a power split between drive shaft GW1, rotor of the electric machine EM and the output shaft GW2 can be realized. In the engagement sequence diagram, an X denotes which of the shift elements 04, 05, 06, 13, 14 are closed to form the respective gear ratio stage 21 to 26 or operating modes E1, E2, E3, EDA.

Figure 19:
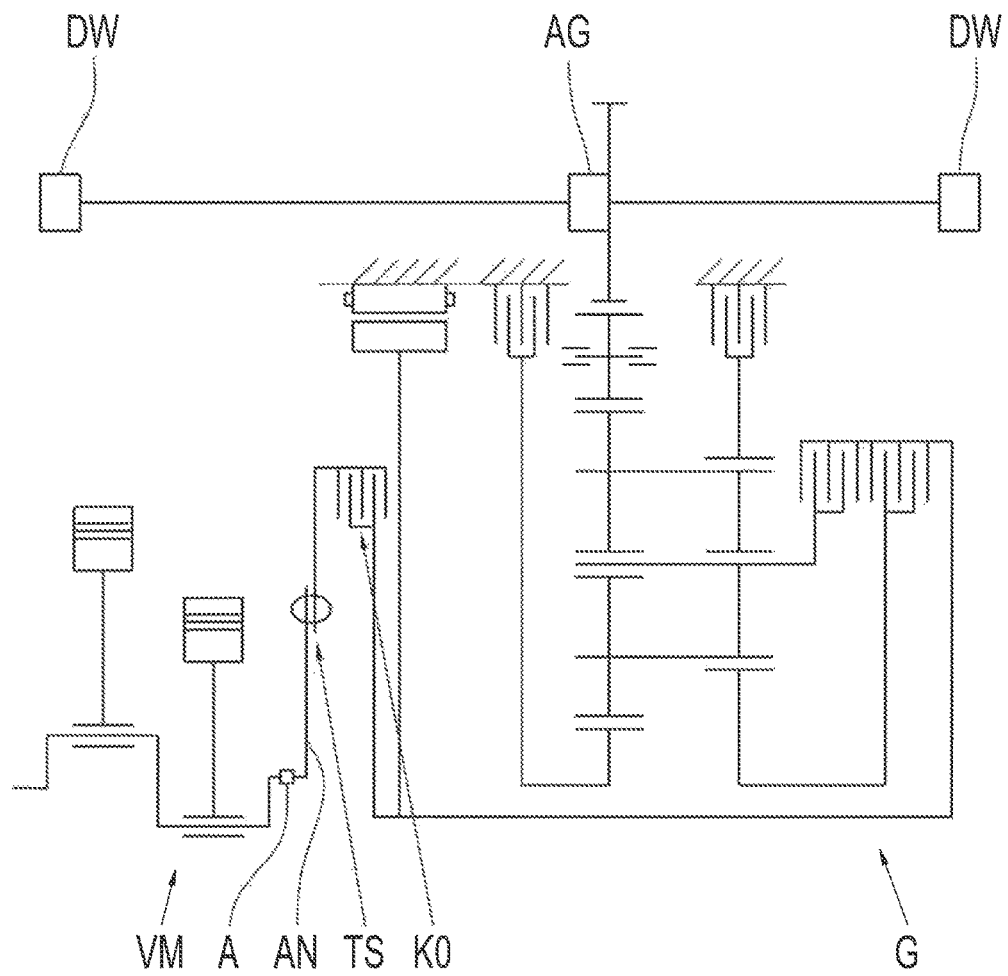
FIG. 19 shows a drive train of a motor vehicle.

FIG. 19 schematically shows a drive train of a motor vehicle. An internal combustion engine VM is connected rotationally fixedly to the interface A of the transmission G. In the connecting shaft AN there is integrated a torsional vibration damper TS which is arranged axially adjacent to the clutch K0. The transmission G illustrated in FIG. 19 corresponds to the second exemplary embodiment of the invention illustrated in FIG. 3 with an integrated electric machine EM. This is to be regarded merely as an example. The internal combustion engine VM could also be connected directly to the drive shaft GW1 of the transmission G via the torsional vibration damper TS. The drive train could be formed with any of the present exemplary embodiments, with or without an electric machine EM. The drive train could comprise a hydrodynamic torque converter in addition or alternatively to the clutch K0, which hydrodynamic torque converter should be arranged in the power flow between the internal combustion engine VM and the drive shaft GW1 of the transmission G. Such a torque converter may also comprise a lock-up clutch. A person skilled in the art will freely configure the arrangement and spatial position of the individual components of the drive train in accordance with the external boundary conditions. The power acting at the output shaft GW2 is distributed to drive wheels DW of the motor vehicle by a differential transmission AG within the transmission.

Modifications and variations can be made to the embodiments illustrated or described herein without departing from the scope and spirit of the invention as set forth in the appended claims.

REFERENCE DESIGNATIONS

G Transmission
GG Housing
GW1 Drive shaft
GW2 Output shaft
PS Planetary gear set system
S1 First sun gear
S2 Second sun gear
P Plant carrier
H1 First ring gear
H2 Second ring gear
R1 First planet gears
R2 Second planet gears
05 First shift element
06 Second shift element
13 Third shift element
14 Fourth shift element
04 Additional shift element
15 Second additional shift element
1-5 First to fifth forward gear ratio
21-27 First to seventh forward gear ratio
R Reverse gear ratio
EM Electric machine
ST Transmission gearing
E1 Electric gear ratio
E2 Electric gear ratio
E3 Electric gear ratio
EDA Power-split operating mode
K0 Clutch
AN Connecting shaft
A Interface
TS Torsional vibration damper
AG Differential transmission
VM Internal combustion engine
DW Drive wheel

The invention claimed is:

1. A transmission (G) for a motor vehicle, the transmission (G) comprising:
    a drive shaft (GW1);
    an output shaft (GW2);
    a planetary gear set system (PS) having a first sun gear (S1), a second sun gear (S2), a planet carrier (P), a first ring gear (H1), a second ring gear (H2), first planet gears (R1), and second planet gears (R2); and
    only four shift elements, namely a first, a second, a third and a fourth shift element (05, 06, 13, 14);
    wherein
        each of the first planet gears (R1) mesh with the first sun gear (S1), the first ring gear (H1), and a respective one of the second planet gears (R2),
        each of the second planet gears (R2) mesh with the second sun gear (S2) and the second ring gear (H2),
        the first and second planet gears (R1, R2) are rotatably mounted on the planet carrier (P),
        the first sun gear (S1) has a smaller effective diameter than the second sun gear (S2),
        the first ring gear (H1) has a larger effective diameter than the second ring gear (H2),
        the output shaft (GW2) is permanently connected to the first ring gear (H1),
        the second ring gear (H2) is rotationally fixable by closing the first shift element (05),
        the drive shaft (GW1) is connectable to the second sun gear (S2) by closing the third shift element (13),
        the drive shaft (GW1) is connectable to the planet carrier (P) by closing the fourth shift element (14), and
        the first sun gear (S1) is rotationally fixable by closing the second shift element (06).

2. A transmission (G) for a motor vehicle, the transmission (G) comprising:
    a drive shaft (GW1);
    an output shaft (GW2);
    a planetary gear set system (PS) having a first sun gear (S1), a second sun gear (S2), a planet carrier (P), a first ring gear (H1), a second ring gear (H2), first planet gears (R1), and second planet gears (R2);
only four shift elements, namely a first, a second, a third and a fourth shift element (05, 06, 13, 14); and
an electric motor (EM) with a rotationally fixed stator and with a rotatable rotor (R), the rotor being permanently connected to the drive shaft (GW1) or to the second sun gear (S2),
wherein
each of the first planet gears (R1) mesh with the first sun gear (S1), the first ring gear (H1), and a respective one of the second planet gears (R2),
each of the second planet gears (R2) mesh with the second sun gear (S2) and the second ring gear (H2),
the first and second planet gears (R1, R2) are rotatably mounted on the planet carrier (P),
the first sun gear (S1) has a smaller effective diameter than the second sun gear (S2),
the first ring gear (H1) has a larger effective diameter than the second ring gear (H2),
the output shaft (GW2) is permanently connected to the first ring gear (H1),
the second ring gear (H2) is rotationally fixable by closing the first shift element (05),
the drive shaft (GW1) is connectable to the second sun gear (S2) by closing the third shift element (13),
the drive shaft (GW1) is connectable to the planet carrier (P) by closing the fourth shift element (14), and
the first sun gear (S1) is rotationally fixable by closing the second shift element (06).

3. A transmission (G) for a motor vehicle, the transmission (G) comprising:
a drive shaft (GW1);
an output shaft (GW2);
a planetary gear set system (PS) having a first sun gear (S1), a second sun gear (S2), a planet carrier (P), a first ring gear (H1), a second ring gear (H2), first planet gears (R1), and second planet gears (R2);
a plurality of shift elements having a first, a second, a third and a fourth shift element (05, 06, 13, 14);
an additional shift element (04),
wherein
each of the first planet gears (R1) mesh with the first sun gear (S1), the first ring gear (H1), and a respective one of the second planet gears (R2),
each of the second planet gears (R2) mesh with the second sun gear (S2) and the second ring gear (H2),
the first and second planet gears (R1, R2) are rotatably mounted on the planet carrier (P),
the first sun gear (S1) has a smaller effective diameter than the second sun gear (S2),
the first ring gear (H1) has a larger effective diameter than the second ring gear (H2),
the output shaft (GW2) is permanently connected to the first ring gear (H1),
the second ring gear (H2) is rotationally fixable by closing the first shift element (05),
the drive shaft (GW1) is connectable to the second sun gear (S2) by closing the third shift element (13),
the drive shaft (GW1) is connectable to the planet carrier (P) by closing the fourth shift element (14),
the first sun gear (S1) is rotationally fixable by closing the second shift element (06), and
the planet carrier (P) is rotationally fixable by closing the additional shift element (04).

4. The transmission (G) of claim 3, wherein five forward gear ratios (1 through 5) between the drive shaft (GW1) and the output shaft (GW2) are shiftable through selective pairwise closure of the four shift elements (05, 06, 13, 14),
a first forward gear ratio (1) being formed by closing the first and the third shift elements (05, 13),
a second forward gear ratio (2) being formed by closing the second and the third shift elements (06, 13),
a third forward gear ratio (3) being formed by closing the third and the fourth shift elements (13, 14),
a fourth forward gear ratio (4) being formed by closing the second and the fourth shift elements (06, 14), and
a fifth forward gear ratio (5) being formed by closing the first and the fourth shift elements (05, 14).

5. The transmission (G) of claim 3, wherein the planetary gear set system (PS) is arranged axially between the fourth shift element (14) and the second shift element (06).

6. The transmission (G) of claim 3, wherein the additional shift element (04) is a positive locking shift element.

7. The transmission (G) of claim 3, wherein the additional shift element (04) is a frictionally engaging frictional shift element, plates of the additional shift element (04) having only lining-free friction surfaces.

8. The transmission (G) of claim 3, further comprising a second additional shift element (15), the drive shaft (GW1) being connectable to the second ring gear (H2) by closing the second additional shift element (15).

9. The transmission (G) of claim 8, wherein the second additional shift element (15) is a positive locking shift element.

10. The transmission (G) of claim 8, wherein the second additional shift element (15) is a frictionally engaging frictional shift element, plates of the second additional shift element (15) having only lining-free friction surfaces.

11. The transmission (G) of claim 3, further comprising an electric motor (EM) with a rotationally fixed stator and with a rotatable rotor (R), the rotor being permanently connected to the drive shaft (GW1) or to the second sun gear (S2).

12. The transmission (G) of claim 11, further comprising an additional transmission gearing (ST), wherein the rotor (R) is permanently connected to the drive shaft (GW1) by the additional transmission gearing (ST).

13. The transmission (G) of claim 11, further comprising an additional transmission gearing (ST), wherein the rotor (R) is permanently connected to the second sun gear (S2) by the additional transmission gearing (ST).

14. The transmission (G) of claim 11, wherein an electric gear ratio stage (E2) between the rotor and the output shaft (GW2) is implementable by closing the first shift element (05) when the rotor is permanently connected to the second sun gear (S2).

15. The transmission (G) of claim 11, wherein an electric gear ratio stage (E3) between the rotor and the output shaft (GW2) is implementable by closing the second shift element (06) when the rotor is permanently connected to the second sun gear (S2).

16. The transmission (G) of claim 11, wherein a power-split operating mode (EDA) between the drive shaft (GW1), the rotor (R) and the output shaft (GW2) is implementable by closing the fourth shift element (14) when the rotor is permanently connected to the second sun gear (S2).

17. The transmission (G) of claim 3, further comprising a clutch (K0) between the drive shaft (GW1) and a connecting shaft (AN) of the transmission (G), the connecting shaft (AN) having an interface (A) to a drive unit external to the transmission.

18. The transmission (G) of claim 17, wherein the connecting shaft (AN) has two sections connected to each other by at least one torsional vibration damper (TS).

19. A drive train for a motor vehicle having the transmission (G) of claim 3.

\* \* \* \* \*